United States Patent
Xia et al.

(10) Patent No.: US 7,028,254 B2
(45) Date of Patent: *Apr. 11, 2006

(54) SYSTEM AND METHOD FOR PROVIDING A MARKETING PRESENTATION

(75) Inventors: Chun R. Xia, Palo Alto, CA (US); Yufeng Li, Santa Clara, CA (US); Bo Li, Mountain View, CA (US); Victor S. Zhu, Belmont, CA (US); Yang Li, Fremont, CA (US)

(73) Assignee: PeopleSoft, Inc., Plesanton, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 65 days.

(21) Appl. No.: 09/483,175

(22) Filed: Jan. 13, 2000

(65) Prior Publication Data

US 2002/0099556 A1 Jul. 25, 2002

Related U.S. Application Data

(60) Provisional application No. 60/175,869, filed on Jan. 12, 2000.

(51) Int. Cl.
*G06F 17/00* (2006.01)

(52) U.S. Cl. .................... 715/513; 705/25; 705/27
(58) Field of Classification Search ............... 715/513, 715/501.1, 531, 530; 705/27, 25; 707/513
See application file for complete search history.

(56) References Cited

U.S. PATENT DOCUMENTS

| | | | |
|---|---|---|---|
| 5,717,923 A | | 2/1998 | Dedrick |
| 5,724,521 A | * | 3/1998 | Dedrick ............ 705/10 |
| 5,860,073 A | * | 1/1999 | Ferrel et al. ............ 707/513 |
| 5,873,068 A | * | 2/1999 | Beaumont et al. ........... 705/27 |
| 5,890,175 A | * | 3/1999 | Wong et al. ............ 705/26 |
| 5,907,837 A | * | 5/1999 | Ferrel et al. ............ 705/27 |
| 5,933,811 A | | 8/1999 | Angles et al. |

(Continued)

FOREIGN PATENT DOCUMENTS

| | | |
|---|---|---|
| EP | 0 774 722 A2 | 5/1997 |
| GB | 2 343 972 | 5/2000 |
| JP | 9-160896 | 6/1997 |
| WO | WO 99/62013 A1 * | 12/1999 |
| WO | WO/99/63453 | 12/1999 |
| WO | WO 01/01686 A1 * | 1/2001 |
| WO | WO 01/08052 A1 * | 2/2001 |

OTHER PUBLICATIONS

McDernott, Dan (Contact). "Pageflex Introduces Webform Wizard(TM) for the Pageflex(TM) MPower(TM) Application Suite", as presented by Pageflex, Inc from www.pageflexine.com/wfwiz.htm; downloaded Mar. 2001, pp. 1–2.*

Screenshot of file attributes of a JPEG file (right click on properties of JPEG file), as presented by Windows NT ver. 4.0, service pack 5, (c) Dec. 1998.*

*Primary Examiner*—Sanjiv Shah
(74) *Attorney, Agent, or Firm*—Carr & Ferrell LLP

(57) ABSTRACT

According to an embodiment of the present invention, a web page can be dynamically created by a non-technical person. A technical person can set up a web page and incorporate marketing object containers. A non-technical person, such as a marketing person, then decides what marketing object to put into the various marketing object containers. Style templates, marketing campaigns, and various items associated with the campaigns may be used to create or change the web page. According to an embodiment of the present invention, these marketing object containers may be dynamically associated with different marketing object at different times.

38 Claims, 18 Drawing Sheets

U.S. PATENT DOCUMENTS

| | | | | |
|---|---|---|---|---|
| 5,937,392 | A | 8/1999 | Alberts | |
| 5,956,737 | A | 9/1999 | King et al. | 707/517 |
| 5,983,227 | A | 11/1999 | Nazem et al. | 707/10 |
| 5,991,735 | A * | 11/1999 | Gerace | 705/10 |
| 6,009,410 | A * | 12/1999 | LeMole et al. | 705/14 |
| 6,026,368 | A * | 2/2000 | Brown et al. | 705/27 |
| 6,029,195 | A * | 2/2000 | Hertz | 707/10 |
| 6,061,057 | A * | 5/2000 | Knowlton et al. | 705/26 |
| 6,119,101 | A * | 9/2000 | Peckover | 705/10 |
| 6,128,651 | A | 10/2000 | Cezar | |
| 6,137,483 | A | 10/2000 | Kiyono et al. | 345/302 |
| 6,141,666 | A * | 10/2000 | Tobin | 707/513 |
| 6,144,944 | A * | 11/2000 | Kurtzman, II et al. | 705/26 |
| 6,157,926 | A * | 12/2000 | Appleman et al. | 707/513 |
| 6,161,112 | A * | 12/2000 | Cragun et al. | 707/513 |
| 6,161,114 | A * | 12/2000 | King et al. | 707/517 |
| 6,167,383 | A * | 12/2000 | Hensen | 705/27 |
| 6,182,050 | B1 * | 1/2001 | Ballard | 705/14 |
| 6,188,398 | B1 * | 2/2001 | Collins-Rector et al. | 345/327 |
| 6,199,106 | B1 * | 3/2001 | Shaw et al. | 709/217 |
| 6,313,835 | B1 * | 11/2001 | Gever et al. | 707/513 |
| 6,385,592 | B1 | 5/2002 | Angles et al. | |
| 6,466,975 | B1 | 10/2002 | Sterling | |

* cited by examiner

Feature Binding

| Marketing Object Container ID | Feature |
|---|---|
| 102 | Cross Sell |

Feature Table

| Feature | Current Item | Item | 700 |
|---|---|---|---|
| Cross Sell | Canon Camera | Camera Pouch | |
| Cross Sell | Canon Camera | Slide pager | |
| Up Sell | Canon Camera | Nikon Camera | |

FIG. 9

| FIG. 9A |
|---------|
| FIG. 9B |

FIG. 9A

Cross sells in the feature table (semantic network)

| Feature | Current Item | Item | Starting Time | Ending Time | Marketing Object Container | Targeting Group | Context Targeting |
|---------|--------------|------|---------------|-------------|---------------------------|-----------------|-------------------|
| Cross Sell | Canon EOS Rebel G with Tamron 28-80MM Zoom Lens Item 91621813646 | Leather Photo/Audio Pouch Item 91621813734T | Jun 10 1999 10:00PM | Jul 10 2001 10:00PM | 410; 10011203; | | For Men; |
| Cross Sell | Canon EOS Rebel G with Tamron 28-80MM Zoom Lens Item 91621813646 | 35MM Slide Pages, 50 Pk. Item 91621813768T | Jun 10 1999 10:00PM | Jul 10 2000 10:00PM | 410; 10011203; | | |
| Cross Sell | Nikon N50 with Tamron 28-80mm Zoom Lens Item 91621813668 | Camplite Camera/Video Illumination Device Item 91621813602S | Jun 10 1999 11:00PM | Jul 10 2000 11:00PM | 410; | | |
| Cross Sell | Nikon N50 with Tamron 28-80mm Zoom Lens Item 91621813668 | Leather SLR Compartment Case Item 91621814779Z | Jun 10 1999 11:00PM | Jul 10 2001 11:00PM | 410; | | |
| Cross Sell | Kids II Easy-Fit Soft Sole Shoes Item 9162181417S3 | © Disney Ursula Doll Item 91621813929O | Jun 10 1999 11:00PM | Jul 10 2001 11:00PM | 410; | | |
| Cross Sell | Hewlett Packard LaserJet 3100se Printer Item 91621814644O | Hewlett Packard Bright White Inkjet Paper Item 9162181457Z9 | Jun 10 1999 11:00PM | Jul 10 2001 11:00PM | 410; | | |
| Cross Sell | Camping Package Item 1216 | Holga 120S Box Camera Item 9162181370I8 | Jun 12 1999 1:00PM | Jul 12 2004 1:00PM | 410; | | Deal finder; |

| | | | | | |
|---|---|---|---|---|---|
| Cross Sell | Canon EOS Rebel G with Tamron 28-80MM Zoom Lens Item 916218136466 | ColorPage-Color Scanner Item 916218135705 | Jun 24 1999 11:00AM | Jul 27 2000 11:00AM | |
| Cross Sell | Camping Package Item 1216 | Tour Gate Package Item 2007 | Jun 27 1999 12:00PM | Jul 27 2000 12:00PM | 10011207; |
| Cross Sell | JBL 2-Way Dual 4-1/2" Center Channel Speaker Item 916218148833 | Bic 70 Watt 10" Powered Subwoofer Item 916218150185 | Jun 27 1999 6:00PM | Jul 27 1999 6:00PM | |
| Cross Sell | Bic 70 Watt 10" Powered Subwoofer Item 916218150185 | JBL 2-Way Dual 4-1/2" Center Channel Speaker Item 916218148833 | Jun 27 1999 6:00PM | Jul 27 1999 6:00PM | |
| Cross Sell | The Crosley 1930's Bluebird Radio Replica Item 916218137898 | Crosley Country Wall Phone Item 916218136008 | Jun 27 1999 8:00PM | Jul 27 2000 8:00PM | |
| Cross Sell | Canon EOS Rebel G with Tamron 28-80MM Zoom Lens Item 916218136466 | Vivitar ViviCam 2500 Digital Camera Item 916218146951 | Jun 28 1999 5:00AM | Jul 28 1999 5:00AM | 10011203; |
| Cross Sell | Canon EOS Rebel G with Tamron 28-80MM Zoom Lens Item 916218136466 | ColorPage-Color Scanner Item 916218135705 | Aug 25 1999 2:00PM | Sep 24 1999 2:00PM | |

<% vShelf "101" %>
<% vShelf "102" %>
<% vShelf "103" %>

•
•
•

SYSTEM AND METHOD FOR PROVIDING A MARKETING PRESENTATION

RELATED APPLICATIONS

This application claims priority to U.S. Provisional Application Ser. No. 60/175,869, entitled A SYSTEM AND METHOD FOR PROVIDING A MARKETING PRESENTATION, filed Jan. 12, 2000, which is herein incorporated by reference in its entirety for all purposes.

This application is related to U.S. application Ser. No. 09/483,388, entitled A SYSTEM AND METHOD FOR PROVIDING A DISTRIBUTED MARKETING PRESENTATION, filed Jan. 13, 2000.

FIELD OF THE INVENTION

The present invention relates to electronic commerce. In particular, the present invention relates to presenting information related to marketing for use with a computer system.

BACKGROUND OF THE INVENTION

Although a commercial presence over the Internet is becoming standard, it is still very expensive and requires software experts to create and maintain a commercial website. A typical scenario may require a marketing group to create and maintain a marketing presentation but the marketing people are typically unable to directly incorporate their presentation. It is typical for the marketing personnel to notify technical personnel who can then create a new website or update a current website according to the directions given by the marketing personnel. In doing so, the technical personnel typically hard codes the instructions. Accordingly, the marketing personnel is a step away from the final creative product. Due to the high cost and complexity of requiring a technical personnel to hard code each change to an existing web page or to hard code a new web page, the marketing personnel may be discouraged from making regular changes to the web page. This reluctance to make regular changes to the offering may place the electronic commerce merchant at a disadvantage to a traditional competitor since, in a traditional store, daily specials, weekly specials, and seasonal campaigns such as Christmas gift advertising are commonly used.

It would be desirable to allow non-technical personnel, such as a marketing person, to create and update a web page, such as a marketing web page. The present invention addresses such a need.

SUMMARY OF THE INVENTION

According to an embodiment of the present invention, a web page can be dynamically created by a non-technical person. A technical person can set up a web page and incorporate marketing object containers. A non-technical person, such as a marketing person, then decides what marketing objects to put into the various marketing object containers. Style templates, marketing campaigns, and various items associated with the campaigns may be used to create or change the web page. According to an embodiment of the present invention, these marketing object containers may be dynamically associated with different marketing objects at different times.

A method according to an embodiment of the present invention for providing an electronic marketing presentation is presented. The method comprises displaying a marketing object container; associating an attribute with the marketing object container; and selecting at least one marketing object for being associated with the marketing object container.

A method according to an embodiment of the present invention for creating a marketing presentation in a display medium is also presented. The method comprises defining the location and size of a marketing object container in the display medium; associating a marketing attribute with the marketing container, the marketing attribute including parameters that define how the marketing object container can be used in a marketing presentation; binding at least one marketing object to the marketing object container; and displaying the marketing object in the marketing object container in accordance with the parameters of the marketing attribute.

Another method according to an embodiment of the present invention for creating a marketing presentation in an interactive medium is presented. The method comprises displaying a marketing object container on a display medium; in response to a selection of the marketing object container, displaying a number of campaigns that are available to associate with the marketing object container; selecting a campaign to apply to the marketing object container; displaying a plurality of offers that are compatible with the selected campaign; and selecting at least one offer for placing in the marketing object container.

A system according to an embodiment of the present invention for providing an electronic marketing presentation is also presented. The system comprises a processor configured to display a marketing object container. The processor is also configured to facilitate associating an attribute with the marketing object container; and selecting at least one marketing object for being associated with the marketing object container. A memory is coupled with the processor, the memory being configured to provide the processor with instructions.

BRIEF DESCRIPTION OF THE DRAWINGS

The present invention will be readily understood by the following detailed description in conjunction with the accompanying drawings, wherein like reference numerals designate like structural elements, and in which:

FIG. 9 is another example of a feature table according to an embodiment of the present invention, specifically for cross sell.

FIG. 10 shows an example of dynamic binding according to an embodiment of the present invention.

DETAILED DESCRIPTION

The following description is presented to enable one of ordinary skill in the art to make and to use the invention and is provided in the context of a patent application and its requirements. Various modifications to the preferred embodiments will be readily apparent to those skilled in the art and the generic principles herein may be applied to other embodiments. Thus, the present invention is not intended to be limited to the embodiment shown but is to be accorded the widest scope consistent with the principles and features described herein.

Although the present invention can be applied to any content for any type of website, the following description uses an example of a marketing website with marketing content for illustrative purposes only.

Figure 1:
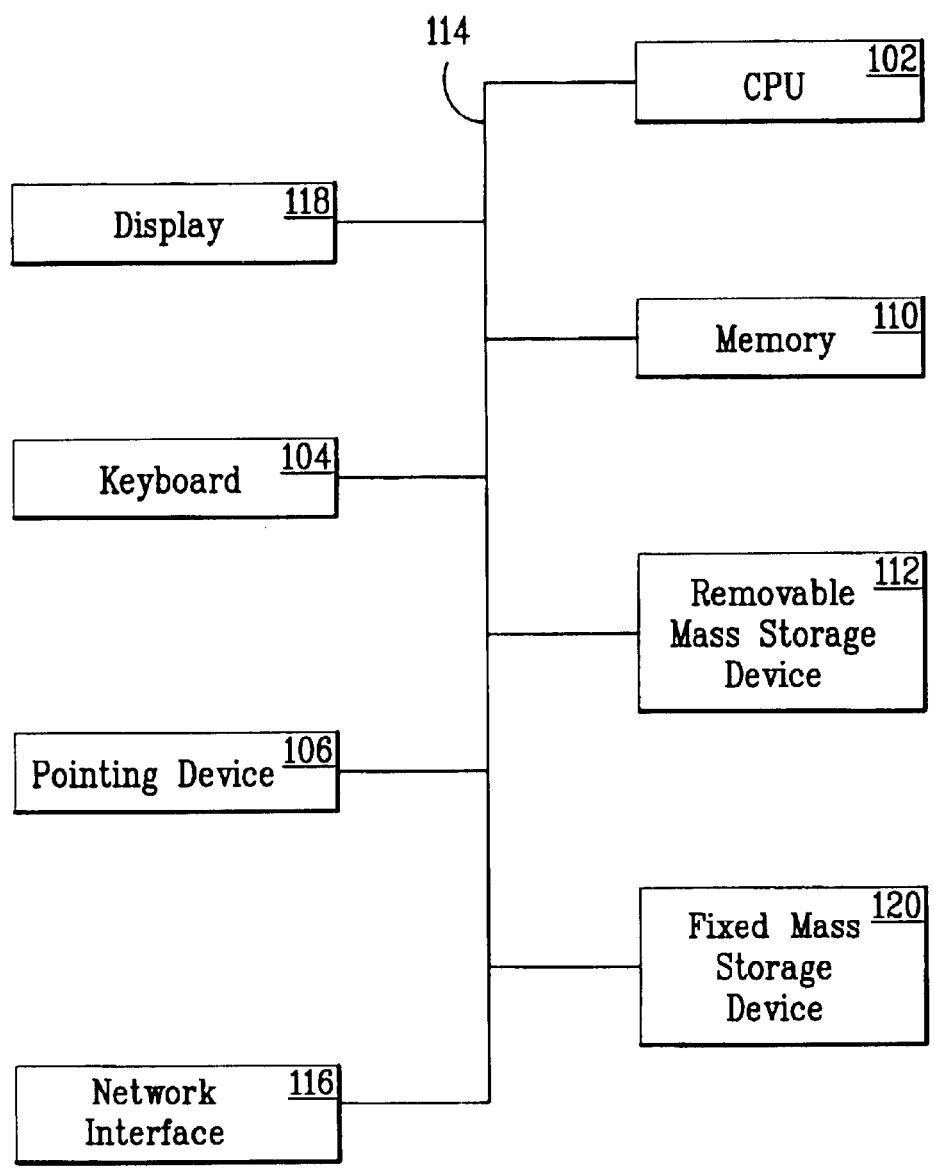
FIG. 1 is a block diagram of a general purpose computer system 100 suitable for carrying out the processing in accordance with one embodiment of the present invention.

FIG. 1 is a block diagram of a general purpose computer system 100 suitable for carrying out the processing in accordance with one embodiment of the present invention. FIG. 1 illustrates one embodiment of a general purpose computer system. Other computer system architectures and configurations can be used for carrying out the processing of the present invention. Computer system 100, made up of various subsystems described below, includes at least one microprocessor subsystem (also referred to as a central processing unit, or CPU) 102. That is, CPU 102 can be implemented by a single-chip processor or by multiple processors. CPU 102 is a general purpose digital processor which controls the operation of the computer system 100. Using instructions retrieved from memory 110, the CPU 102 controls the reception and manipulation of input data, and the output and display of data on output devices.

CPU 102 is coupled bi-directionally with memory 110 which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. It can also store programming instructions and data, in the form of data objects and text objects, in addition to other data and instructions for processes operating on CPU 102. Also as well known in the art, primary storage typically includes basic operating instructions, program code, data and objects used by the CPU 102 to perform its functions. Primary storage devices 110 may include any suitable computer-readable storage media, described below, depending on whether, for example, data access needs to be bi-directional or uni-directional. CPU 102 can also directly and very rapidly retrieve and store frequently needed data in a cache memory (not shown).

A removable mass storage device 112 provides additional data storage capacity for the computer system 100, and is coupled either bi-directionally or uni-directionally to CPU 102. For example, a specific removable mass storage device commonly known as a CD-ROM typically passes data uni-directionally to the CPU 102, whereas a floppy disk can pass data bi-directionally to the CPU 102. Storage 112 may also include computer-readable media such as magnetic tape, flash memory, signals embodied on a carrier wave, PC-CARDS, portable mass storage devices, holographic storage devices, and other storage devices. A fixed mass storage 120 can also provide additional data storage capacity. The most common example of mass storage 120 is a hard disk drive. Mass storage 112, 120 generally store additional programming instructions, data, and the like that typically are not in active use by the CPU 102. It will be appreciated that the information retained within mass storage 112, 120 may be incorporated, if needed, in standard fashion as part of primary storage 110 (e.g. RAM) as virtual memory.

In addition to providing CPU 102 access to storage subsystems, bus 114 can be used to provide access other subsystems and devices as well. In the described embodiment, these can include a display monitor 118, a network interface 116, a keyboard 104, and a pointing device 106, as well as an auxiliary input/output device interface, a sound card, speakers, and other subsystems as needed. The pointing device 106 may be a mouse, stylus, track ball, or tablet, and is useful for interacting with a graphical user interface.

The network interface 116 allows CPU 102 to be coupled to another computer, computer network, or telecommunications network using a network connection as shown. Through the network interface 116, it is contemplated that the CPU 102 might receive information, e.g., data objects or program instructions, from another network, or might output information to another network in the course of performing the above-described method steps. Information, often represented as a sequence of instructions to be executed on a CPU, may be received from and outputted to another network, for example, in the form of a computer data signal embodied in a carrier wave. An interface card or similar device and appropriate software implemented by CPU 102 can be used to connect the computer system 100 to an external network and transfer data according to standard protocols. That is, method embodiments of the present invention may execute solely upon CPU 102, or may be performed across a network such as the Internet, intranet networks, or local area networks, in conjunction with a remote CPU that shares a portion of the processing. Additional mass storage devices (not shown) may also be connected to CPU 102 through network interface 116.

An auxiliary I/O device interface (not shown) can be used in conjunction with computer system 100. The auxiliary I/O device interface can include general and customized interfaces that allow the CPU 102 to send and, more typically, receive data from other devices such as microphones, touch-sensitive displays, transducer card readers, tape readers, voice or handwriting recognizers, biometrics readers, cameras, portable mass storage devices, and other computers.

In addition, embodiments of the present invention further relate to computer storage products with a computer readable medium that contain program code for performing various computer-implemented operations. The computer-readable medium is any data storage device that can store data which can thereafter be read by a computer system. The media and program code may be those specially designed and constructed for the purposes of the present invention, or they may be of the kind well known to those of ordinary skill in the computer software arts. Examples of computer-readable media include, but are not limited to, all the media mentioned above: magnetic media such as hard disks, floppy disks, and magnetic tape; optical media such as CD-ROM disks; magneto-optical media such as floptical disks; and specially configured hardware devices such as application-specific integrated circuits (ASICs), programmable logic devices (PLDs), and ROM and RAM devices. The computer-readable medium can also be distributed as a data signal embodied in a carrier wave over a network of coupled computer systems so that the computer-readable code is stored and executed in a distributed fashion. Examples of program code include both machine code, as produced, for example, by a compiler, or files containing higher level code that may be executed using an interpreter.

The computer system shown in FIG. 1 is but an example of a computer system suitable for use with the invention. Other computer systems suitable for use with the invention may include additional or fewer subsystems. In addition, bus 114 is illustrative of any interconnection scheme serving to link the subsystems. Other computer architectures having different configurations of subsystems may also be utilized.

Figure 2:
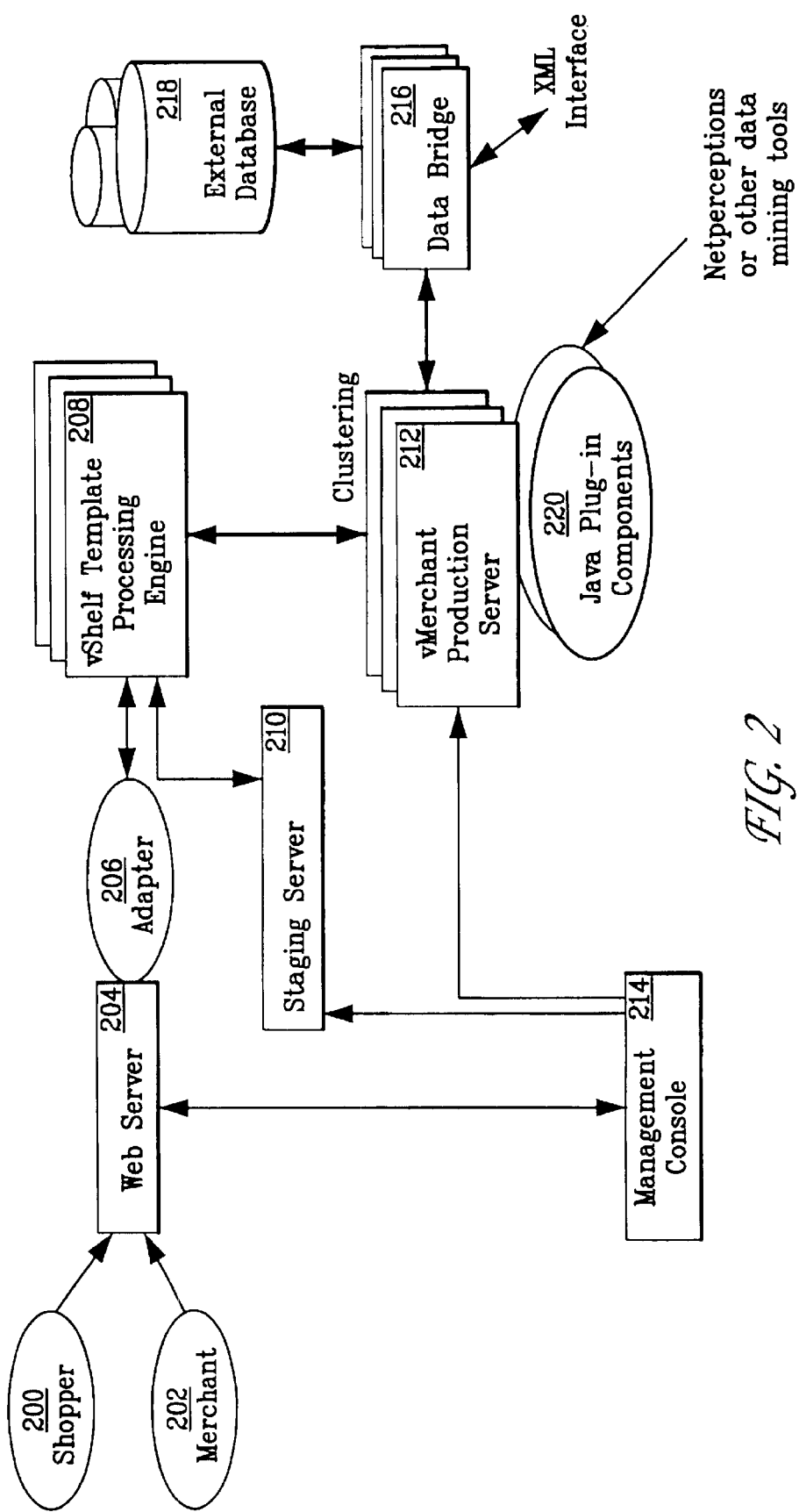
FIG. 2 is a system architecture diagram of an embodiment of the present invention.

FIG. 2 is a system architecture of an embodiment of the present invention. This architecture is shown to include a web server 204, an adapter 206, a template processing engine 208, a staging server 210, a management console 214, a production server 212, plug-in components 220, a data bridge 216, and an external database 218.

In this embodiment, a shopper 200 or a merchant 202 can access a website via the web server 204. Commands given by the shopper 200 or merchant 202 through the web server 204 may be translated by the adapter 206 and fed into the template processing engine 208. The template processing engine 208 can interact with the production server 212 to provide requested information. Examples of requested information include objects to be displayed in the web page, a template for the web page, and a style for a particular campaign associated with the object being shown.

The template processing engine 208 can process popular standard scripting languages such as Java Script, Microsoft Visual Basic Script, Microsoft Active Server Page (ASP), PERL, Sun's Java Server Page (JSP). Accordingly, a marketing object container can be inserted into a web page by using a standard scripting language.

The production server 212 communicates with the template processing engine 208 and can handle processes for marketing campaigns, advertising scheduling, priorities, profile matching for personalization, and features. The production server 212 can be extended with Java plug-in components 220 which allows customization of the production server 212 to fit various merchants' needs.

The production server 212 may also interact with the data bridge 216, which in turn may interact with an external database 218, such as that provided by Oracle. Examples of the external database 218 include Oracle, Sybase, Microsoft SQL server, and IBM DB2. The data bridge establishes the data connectivity to merchant's external data sources such as product catalog data in an enterprise resource planning (ERP) system. Using a data bridge 216 allows flexibility to the merchant 202 to choose the type of database to use with the rest of the architecture. Additionally, the data bridge 216 can be used to connect to other applications such as legacy applications for the merchant 202, or be used as an extensible markup language (XML) interface.

The production server 212 may interact with plug-in components 220 such as Java plug in components. These Java plug in components 220 may be components provided by a user of the production server, such as the merchant. For example, the Java plug-in components 220 may be a data mining tool such as that produced by NetPerceptions.

The merchant 202 may access the management console 214 through the web server 204. The management console 214 is an interface for the merchant 202 which can look like a website to access the production server. The management console 214 allows the merchant 202 to interact with the production server 212 and the staging server 210 to create or modify offerings made to the shopper 200. Examples of the web server 204 include Microsoft Internet Information Server, Netscape Enterprise Server, and Apache.

The adapter 206 integrates the web server 204 to the rest of the architecture. When a command for the marketing object container is received through the web server 204, the adapter 206 is invoked and it translates the command and invokes the template processing engine 208. The advantage of using an adapter 206 is that it allows the system to be independent of different web servers 204 and different standard scripting languages. Additionally, the adapter can also be adapted to process additional functions such as session management. For example, the adapter 206 can be used to create a cookie to associate with a user for a session information.

The staging server 210 may be used to test out a marketing offering or a marketing campaign prior to making it available to the public through the production server 212.

Further details of the functions of the various components of the architecture shown in FIG. 2 are later discussed in conjunction with the remaining figures.

Figure 3:
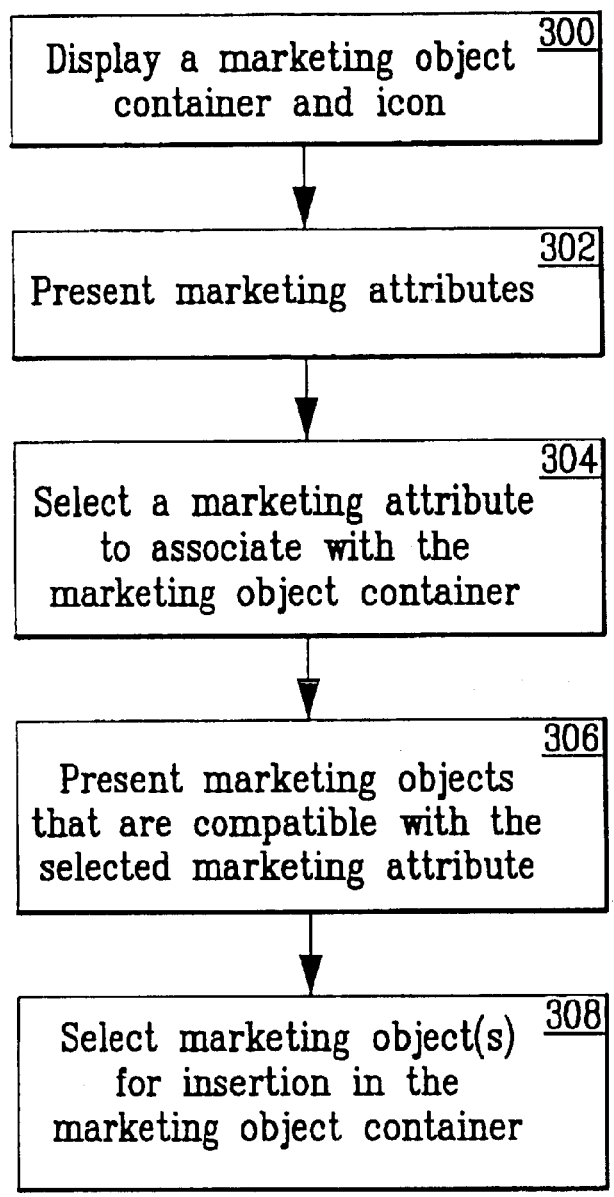
FIG. 3 is a flow diagram of a method according to an embodiment of the present invention for providing a marketing presentation for use with a computer system.

FIG. 3 is a flow diagram of a method according to an embodiment of the present invention for providing a marketing presentation for use with a computer system. A marketing object container and icon are displayed (step 300). A marketing object container, as referred to herein, includes a marketing location for receiving marketing objects to present to a user of an interactive medium, such as a networked device. These marketing object containers can be used by an authorized user, including a non-technical user such as marketing personnel, as reusable locations for objects to be presented, such as objects that are part of a marketing presentation. Examples of an interactive display medium include the Internet web browser, interactive television, public kiosks, cellular phone, PDA, and multimedia devices. A marketing object container may include program codes, such as HTML code, that identifies a location and size of the marketing object container on a display area, for example, a web page. The marketing object containers can be defined by any descriptors in any coding tool for use in any display medium.

Marketing attributes are then presented (step 302). Marketing object containers can be associated with marketing attributes that describe, for example, what marketing objects can be received by the marketing object container, the relationship of a particular marketing object container to other marketing object containers, or the timing and priority of the display of marketing objects. A marketing object is any offering that can be presented in a marketing object container. Examples of marketing objects include products offered for sale or rent, offered services, and property for sale or rent.

Examples of a marketing attribute include marketing campaigns and features in merchandising marketing, scheduling of objects to be displayed, behavior-driven targeting of marketing material to a user, and profile-driven targeting of the marketing material to a user. Examples of marketing campaigns and features which may be included as marketing attributes include the following:

Ad Banner
Catalog Promotion
Category Dependent Content
Category List
Category Path
Category Promotion
Co-Marketed Item
Co-Marketing
Content Detail
Cross Sell
Daily Promotion
Event Promotion
General Promotion
Gift Center
Holiday Promotion
Impulse Buy
Item Content
Item Detail
Monthly Promotion
Most Visited Category
Navigation Focus
New Product Introduction
On Sale
Search Results
Service Content
Service Cross Sell
Service Item Cross Sell
Service Promotion
Service Up Sell
Show Profile
Theme Dependent Content
Theme Park
Theme Path
Theme Promotion
Theme Service
Up Sell
Weekly Promotion A marketing attribute may be selected to be associated with the particular marketing object container (step 304).

Marketing objects that are compatible with the selected marketing attribute are then presented (step 306). An example of a marketing object that is compatible with a selected marketing attribute may be a camera that is within a selected marketing campaign of Christmas gifts to be displayed in the month of December.

One or more or the presented marketing objects are then selected for insertion into the marketing object container shown on the web page (step 308). In this manner, a web page is dynamically changed by changing the marketing objects of a marketing object container within the web page without changing the rest of the web page.

Figure 4A:
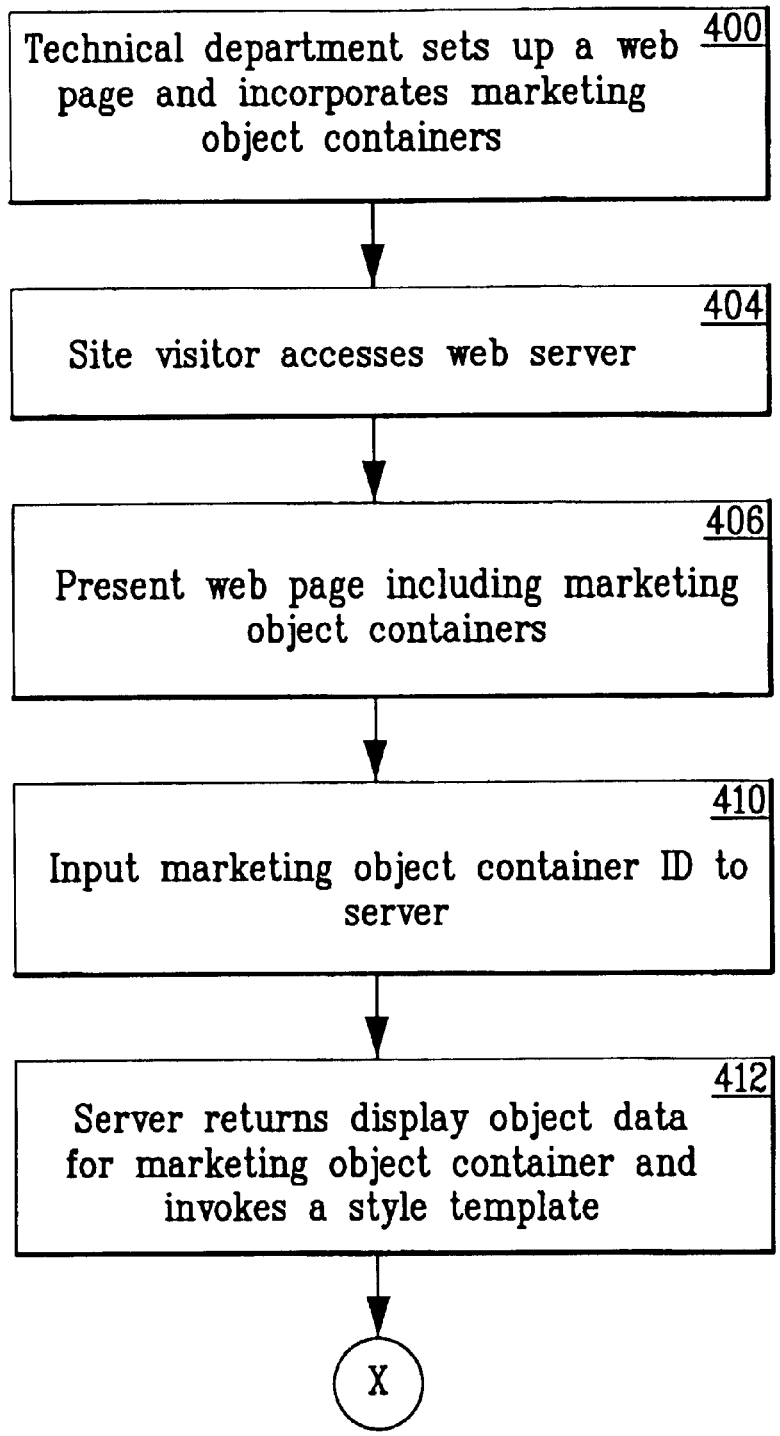
FIGS. 4a–4b are flow diagrams describing an example of a process occurring in connection with a template processing engine.
Figure 4B:
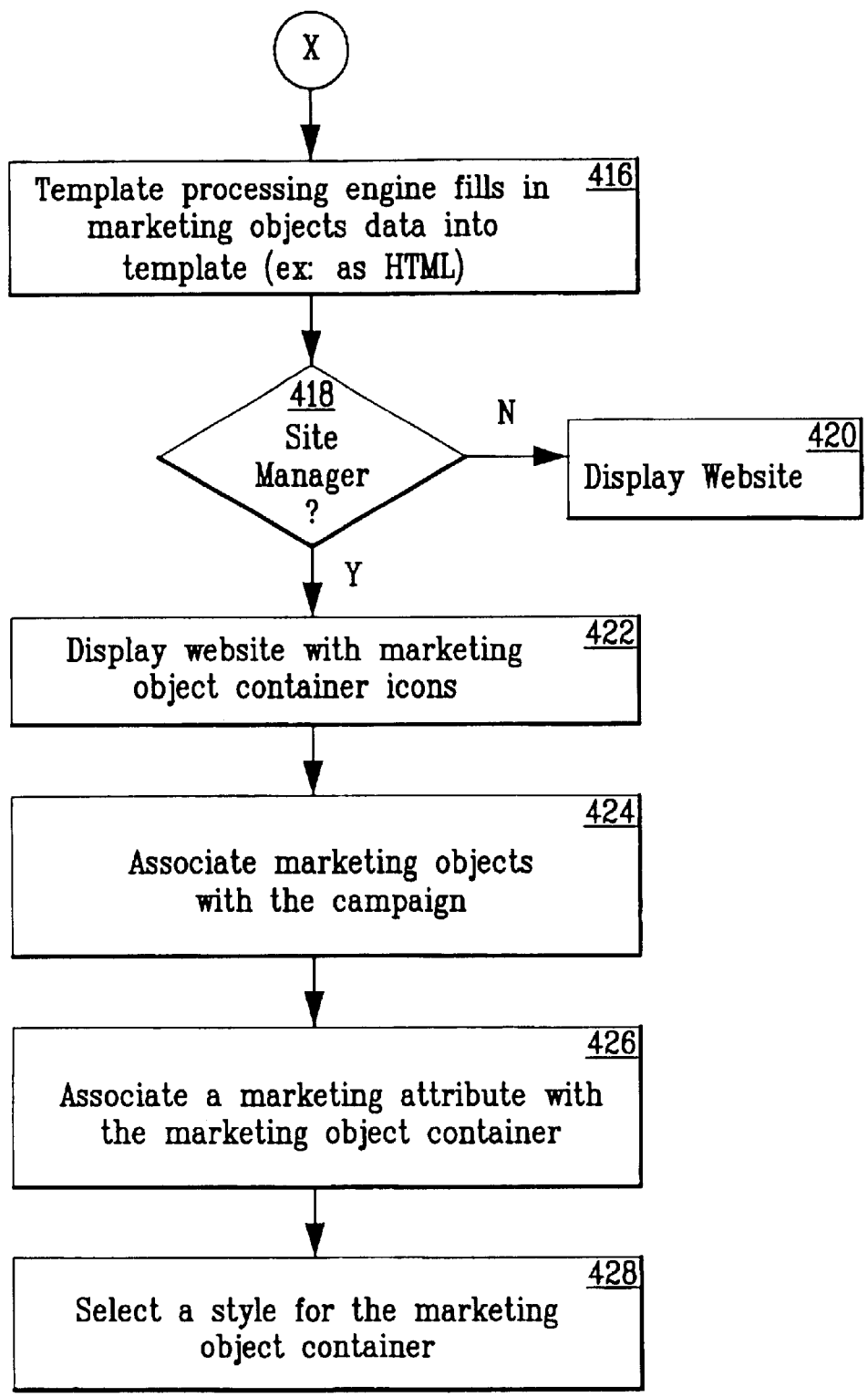

FIGS. 4*a*–4*b* are flow diagrams describing an example of a process occurring in connection with the template processing engine 208 of FIG. 2. Initially, a web page is set up incorporating marketing object containers (step 400). A site visitor accesses the web server (step 404). The web page, including the marketing object containers, are then presented (step 406). A container identification (ID) associated with the selected marketing object container is automatically input into the server, such as production server 212 of FIG. 2 (step 410). The server then returns display object data for the selected marketing object container and invokes a style template (step 412). The template processing engine, such as the template processing engine 208 of FIG. 2, then fills in the marketing object data into the template in a readable format, such as hyper-text markup language (HTML) (step 416).

It is determined whether the site visitor is a site manager (step 418). The site manager may be anyone who is authorized to change or create the web page. If the site visitor is not a site manager, then the website is displayed in the form that it would be displayed to a shopper (step 420). If, however, the site visitor is a site manager (step 418), then the website that is normally displayed to a shopper is displayed with the addition of marketing object container icons (step 422). In addition to the marketing object container icons, a workspace associated with the selected icons may also be presented. Alternatively, a workspace may be hyperlinked to a selected icon. An example of such a website is shown in FIG. 5.

Figure 5:
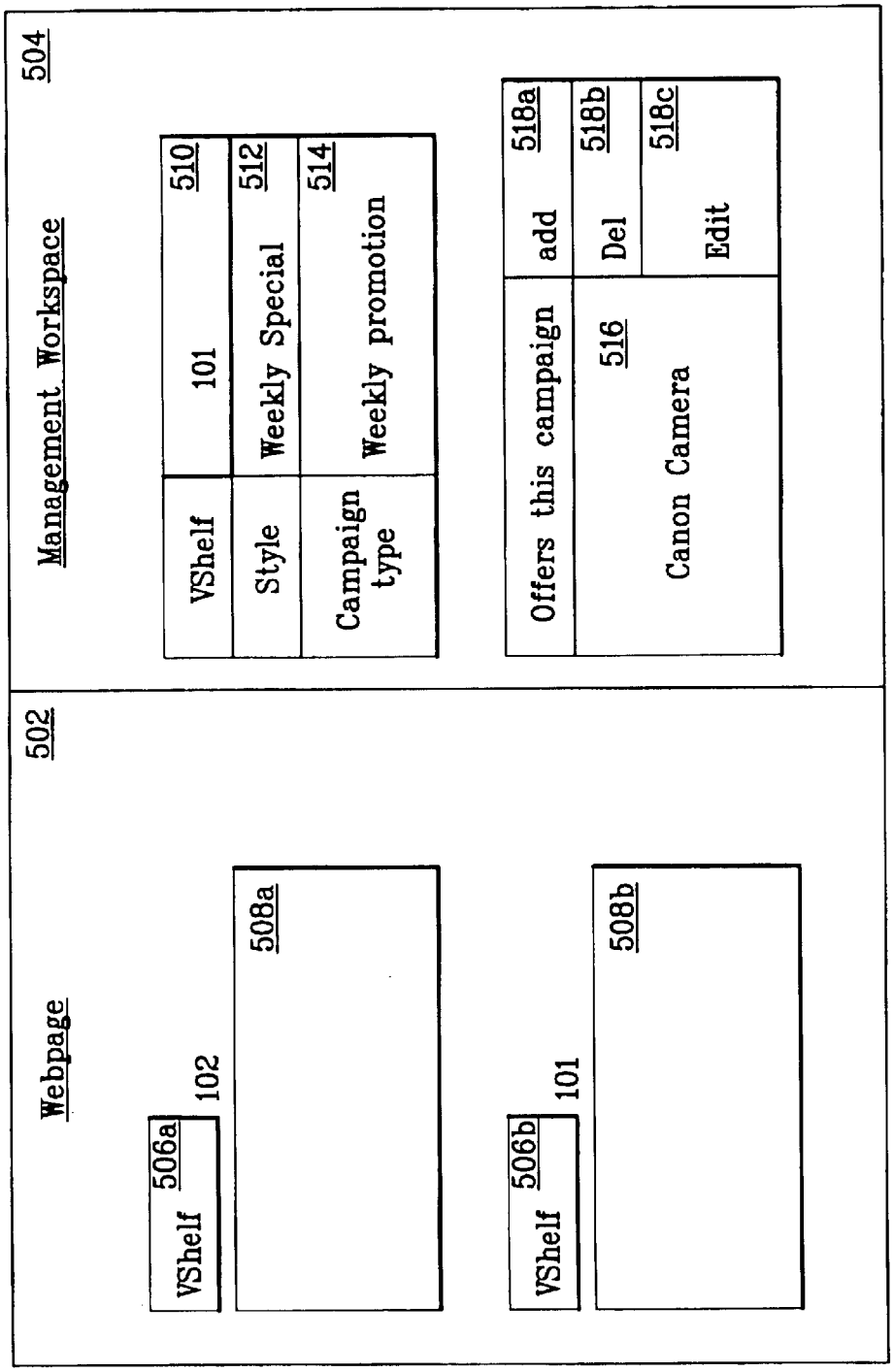
FIG. 5 is an example of a web page as shown to someone authorized to change the web page according to an embodiment of the present invention.

FIG. 5 is an example of a web page as shown to someone authorized to change the web page according to an embodiment of the present invention. The website 500 is shown to include a web page 502 and a management workspace 504. The web page includes marketing object containers 508*a*–508*b* and marketing object container icons 506*a*–506*b*. When a marketing object container icon is selected, the workspace 504 may show information related to the marketing object container associated with the selected icon.

Once the website with the marketing object container icons are displayed (step 422 of FIG. 4*b*), marketing objects, such as items offered for sale, may be associated with the selected campaign (step 424). In the example shown in FIG. 5, the item 516 that is selected is a Canon camera. The campaign 516 that is selected is a weekly promotion. The item 516 may be added 518*a*, deleted 518*b*, or edited 518*c*.

A marketing attribute may be associated with a selected marketing object container (step 426). In the example shown in FIG. 5, the marketing object container 508*b* may be selected by selecting the container icon 506*b* associated with the container 508*b*. When a marketing object container is selected, the management workspace 504 displays attributes associated with the selected marketing object container 508*b*. In this example, the attributes include the container ID 510, the container style 512, the campaign type 514 associated with the container 508*b*, and an offer or multiple offers 516 associated with the container 508*b*. A user can select a predetermined attribute by viewing options by selecting a type of attribute. For example, the user may select the attribute "style" 512 and see predetermined options such as weekly special, daily special, holiday special, etc.

A style may also be selected for the marketing object container (step 428). Although a style is a marketing attribute, a style is preferably selected for the marketing object container in addition to other attributes. Accordingly, in the example shown in FIG. 5, a Canon camera may be shown in a style defined by "weekly specials" in a campaign entitled "weekly promotion". For example, the marketing object container 508b may display a Canon camera 516 in a presentation style which includes a blue background with text at the bottom below the Canon camera.

Figure 6A:
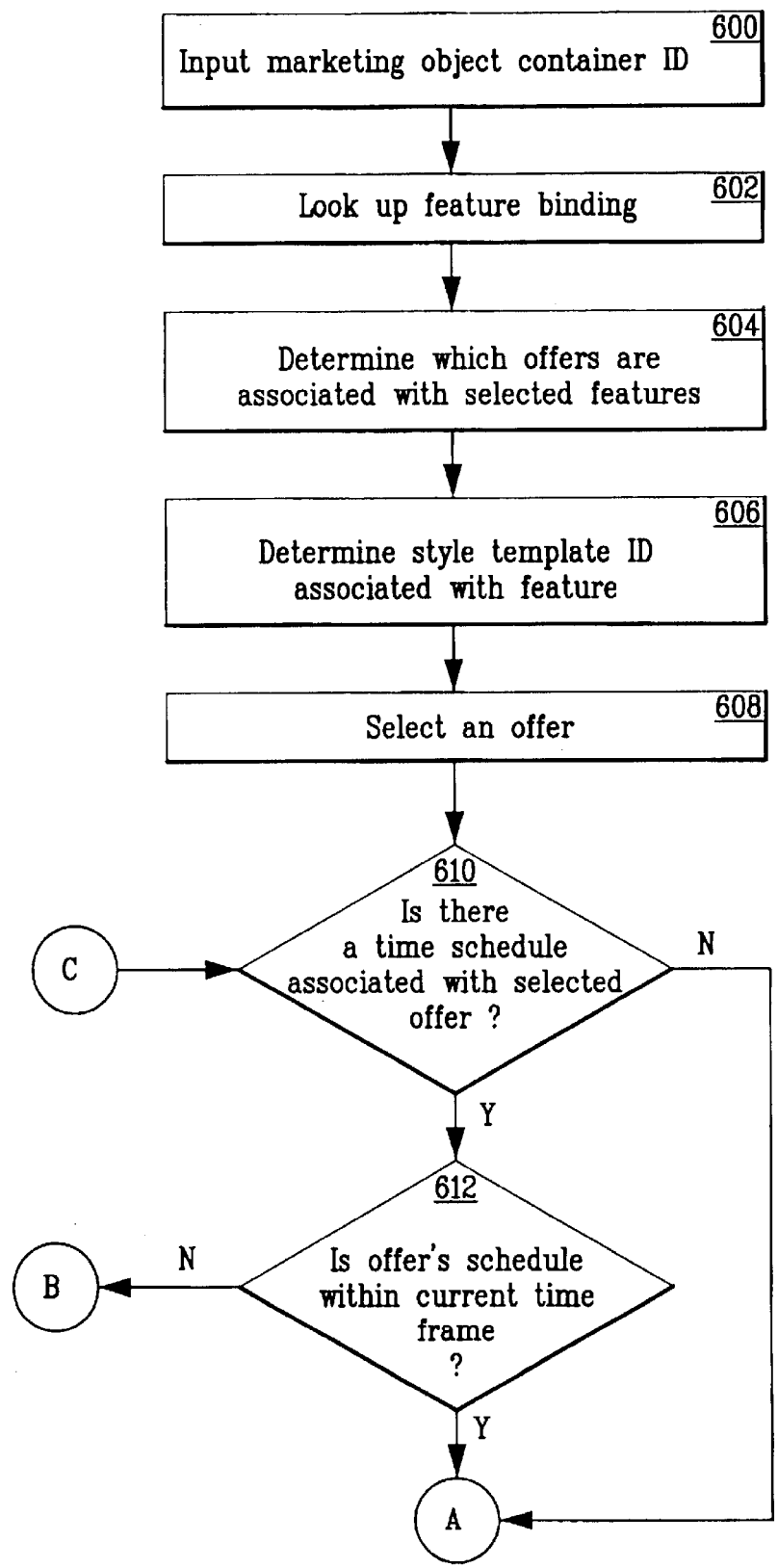
FIGS. 6a–6b are flow diagrams further describing events between steps 410–412 of FIG. 4A according to an embodiment of the present invention.
Figure 6B:
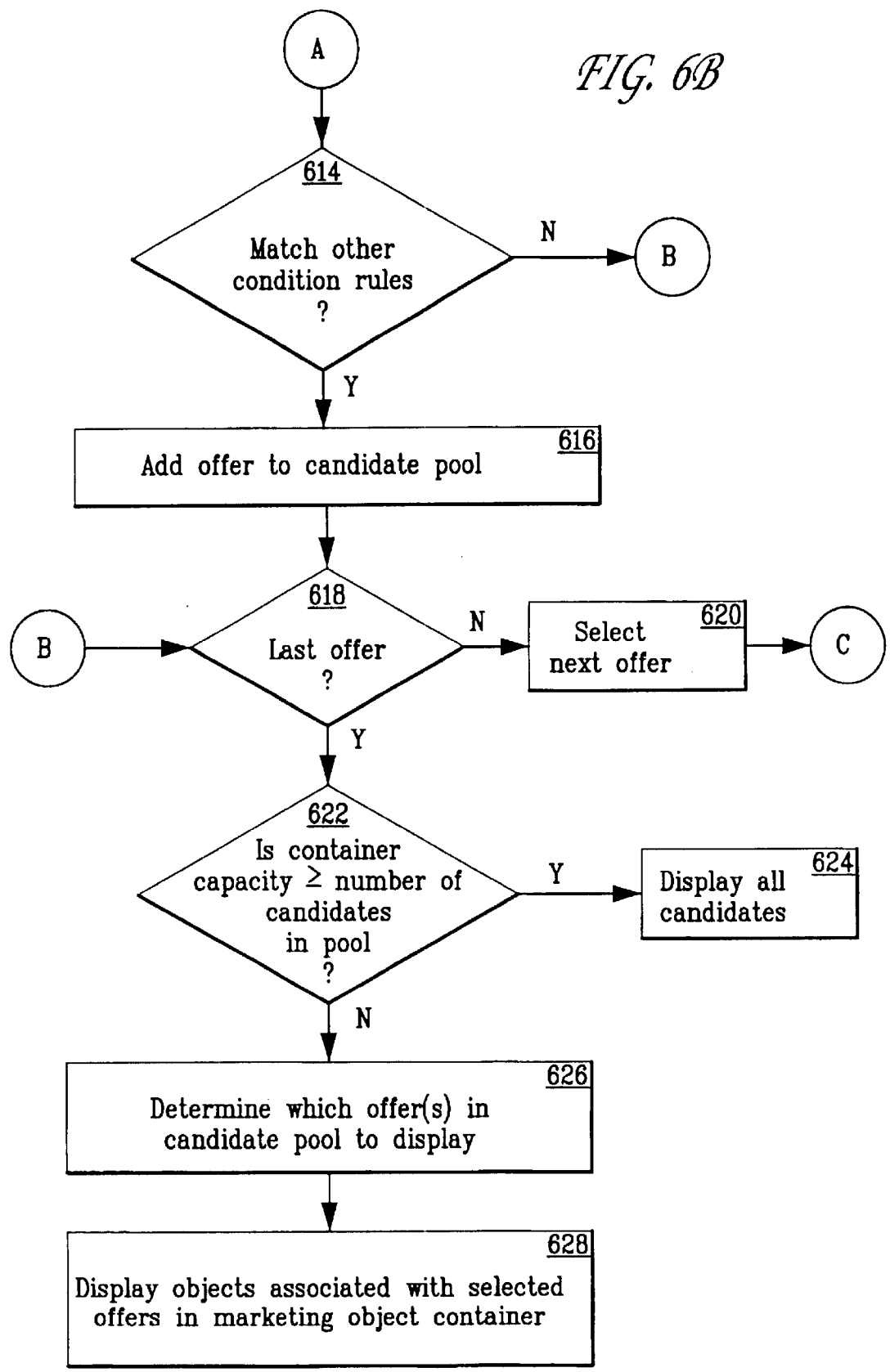

FIGS. 6a–6b are flow diagrams further describing events between steps 410–412 of FIG. 4A which can occur in the production server, such as production server 212 of FIG. 2.

Figures 7A, 7B, 8:
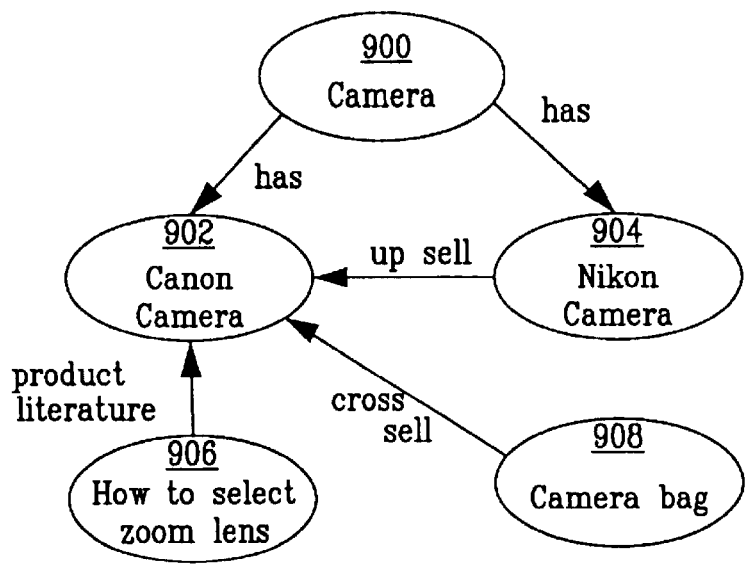
FIG. 7a shows an example of a feature binding table according to an embodiment of the present invention.
FIG. 7b shows an example of a feature table which lists offers associated with a particular feature according to an embodiment of the present invention.
FIG. 8 shows an example of relationships between items according to an embodiment of the present invention.

A marketing object container ID is input into the server (step 600). Step 600 is equivalent to step 410 of FIG. 4a. A feature binding associated with the selected marketing object container is then determined (step 602). An example of a feature binding table is shown in FIG. 7a. The feature binding table of FIG. 7a shows a marketing object container ID such as ID "102", and a feature associated with that marketing object container ID, such as cross sell.

It is then determined which offers are associated with the selected features (step 604). FIG. 7b shows an example of a feature table which lists offers associated with a particular feature. In this example, the selected feature is a cross sell. Assume that the current item being displayed is a Canon camera. The offers 700 associated with the selected feature, "cross sell", for the current item "canon camera" are "camera pouch" and "slide pager". The relationship between the "current item" and the featured item is illustrated in FIG. 8.

FIG. 8 shows an example of relationships between items according to an embodiment of the present invention. In this example, the item "camera" 900 has or includes a Canon camera 902 as well as a Nikon camera 904. The "current item" of the example shown in FIG. 7b is the Canon camera 902. The remaining items, the Nikon camera 904, the camera bag 908, and "how to select zoom lens" 906 are all defined in terms of the "current item", in this case the Canon camera 902. In this example, the Nikon camera 904 is an up sell of the Canon camera 902, the camera bag 908 is a cross sell of the Canon camera 902, and the "how to select zoom lens" 906 is a product literature of the Canon camera 902. Further details of the relationships between items are later discussed in conjunction with FIG. 11.

Moving back to FIG. 6, a style template ID associated with the selected feature is also determined (step 606). The style template ID identifies a style associated with the selected feature. For example, for the feature "cross sell", the style template may be the same style as the current item, the Canon camera, such that the background of the cross sell item is blue with text located below the offered item.

An offer is then selected (step 608). Although in the example shown in FIG. 7b an offer is shown to be an item for sale, an offer can generally be a product or a service offered for sale or lease or license.

It is then determined whether there is a time schedule associated with the selected offer (step 610). If there is a time schedule associated with the selected offer (step 610) then it is determined whether the offer's schedule is within the current time frame (step 612). Examples of the schedules associated with an offer are shown in FIG. 9.

FIG. 9 is another example of a feature table, specifically for cross sell. In this example, the feature is "cross sell" and the "current item" identifies the offer to which the cross sell item is related. For example, the item "leather photo/audio pouch" is a cross sell item to "Canon EOS Rebel G with Tamron 28–80 MM zoom lens". A starting time associated with a cross sell item "leather phone/audio pouch" is Jun. 10, 1999 at 10 p.m. and ending time is Jul. 10, 2001 at 10 p.m. During the time between the starting time and the ending time, the leather photo/audio pouch will be used as a cross sell item to the Canon camera. This cross sell item is associated with a marketing object container ID "410" and "10011203" in this example.

If there is no time schedule associated with the selected offer (step 610), or the offer's schedule is within the current time frame (step 612), then it is determined whether other condition rules are matched (step 614). Examples of other condition rules include whether the user's behavior matches the selected offer for offers associated with a predetermined behavior pattern and whether the user profile matches the offer's targeting group. If these other condition rules do not match with the selected offer (step 614) or if the offer's schedule is not within the current time frame (step 612), then it is determined whether this offer is the last offer in a pool of offers (step 618).

If the selected offer matches the other conditions (step 614), then the offer is added to a candidate pool of offers (step 616). It is then determined whether this offer was the last offer of the possible offers (step 618). If this offer is not the last offer, then the next offer is selected for evaluation (step 620). Thereafter, it is determined whether there is a time schedule associated with this selected offer (step 610 of FIG. 6a).

If this offer was the last offer (step 618), then it is determined whether a capacity associated with the marketing object container is greater or equal to the number of offers in the candidate pool (step 622). If the marketing object container capacity is greater or equal to the number of offers in the candidate pool, then all candidates in the pool are displayed (step 624). If, however, the marketing object container capacity is less than the number of candidates in the candidate pool (step 622) then it is determined which offer or offers in the candidate pool to display (step 626). Examples of methods which may be used to determine which offers to display include rotation, (round robin), priority (wherein some offers are at a higher priority than others), impression based, or random. An example of an impression-based method is pulling up a first offer and displaying it 10,000 times, then after the 10,000$^{th}$ display, pull up the second offer and show it 5,000 times, etc. The objects associated with selected offers are then displayed in the marketing object container (step 628).

In this manner, dynamic binding occurs in a web page such that the marketing objects of the marketing object containers are dynamically changed so that the content shown through the marketing object containers can be changed without affecting the rest of the web page.

Figure 10:
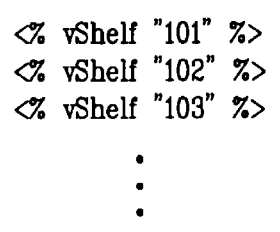

FIG. 10 shows an example of dynamic binding according to an embodiment of the present invention. FIG. 10 shows an example of "hard coded" software codes describing a marketing object container, referred to under a brand name called "VShelf". The codes indicate a variable, such as a number, which identifies the particular marketing object container. For example, "VShelf 101'" might indicate the marketing object container 508b of FIG. 5. The number "101" can be the marketing object container ID, for example. This marketing object container ID may be associated in a feature binding table such as the feature binding table shown in FIG. 7a, with a feature such as cross sell. The identified feature associated with the particular marketing object container may have an item, such as item 700 of FIG. 7b, associated with that particular marketing object container.

The hard coding identifying each of the marketing object containers does not need to be changed when a change in the marketing objects of the marketing object container is desired. When the binding of marketing objects to the variable "101" is changed, the effective result of "Vshelf '101'" is changed. For example, if item 700 of FIG. 7b is changed from "camera bag" to "camera lens", then the marketing object container 508b of FIG. 5 changes from showing an image of a camera bag for sale to a camera lens for sale despite still having the same hardcoded instruction.

Figure 11:
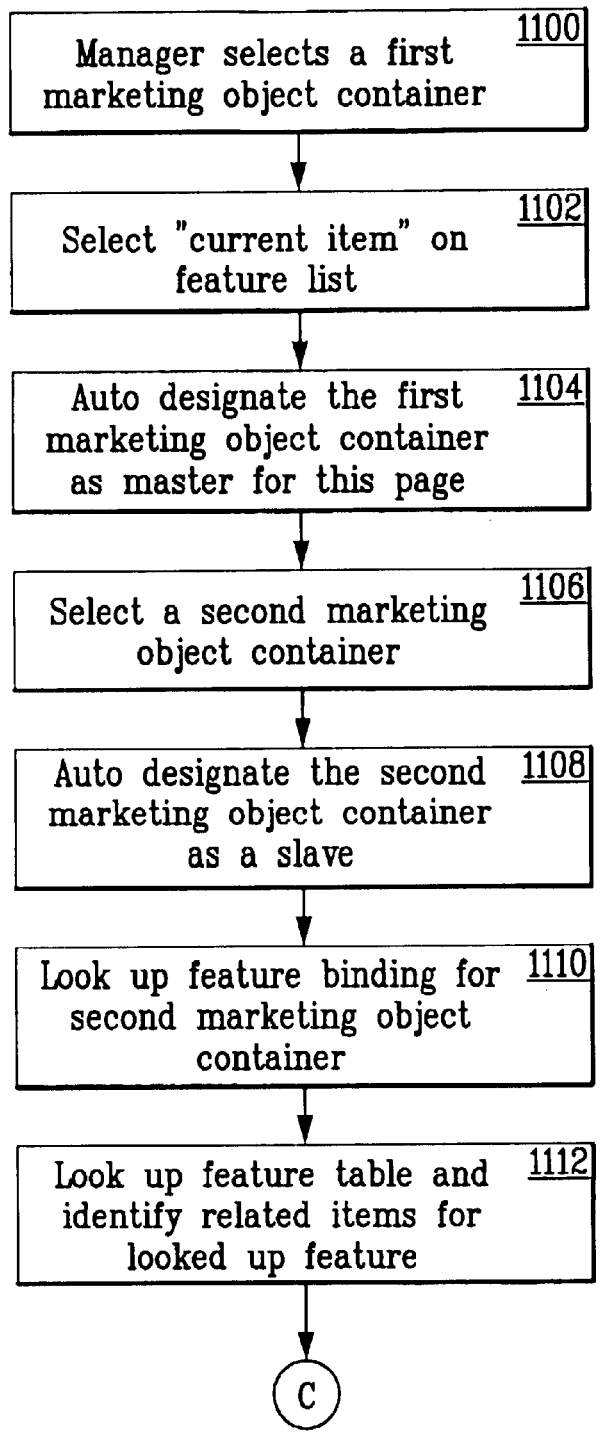
FIG. 11 is a flow diagram of a method according to an embodiment of the present invention for describing interrelationships between marketing object containers.

FIG. 11 is a flow diagram of a method according to an embodiment of the present invention for describing interrelationships between marketing object containers. A qualified user, such as a site manager, selects a first marketing object container (step 1100). For example, a marketing object container such as container 508b of FIG. 5 may be selected. The user then selects "Current Item" on a feature list (step 1102). The current item is whatever item the user selects to offer as a main product in a marketing object container. The feature list is a list of all possible campaign features. The feature list can be presented to the user at the management console, such as management workspace 504 of FIG. 5, as a pull-down list so that the user can click and make a selection.

The first marketing object container is then automatically designated as a master container for this particular web page (step 1104). The master container is the container to which other containers of the same page are referenced. For example, the other containers on the web page may be referenced in conjunction to the master container on the same web page such that the other containers may be considered a cross sell item, an up sell item, or product literature associated with the item in the master container.

A second marketing object container is then selected (step 1106). The selected second marketing object container is then automatically designated as a slave (step 1108). The marketing object of the slave container is referenced in relation to the master container. For example, if container 508b of FIG. 5 is the master container of the web page 502 and container 508a is the slave container of web page 502, then assuming that the master container 508b shows a current item of a Canon camera as shown in FIG. 8, the marketing object of slave container 508a of FIG. 5 is referenced in relation to the Canon camera shown in the master container 508b. For example, the slave container 508a may be defined as a cross sell item to the master container 508b so that the slave container 508a shows a camera bag which is considered a cross sell item in relation to the current item in the master container 508b, the Canon camera.

A feature binding is then determined for the second marketing container (step 1110). As previously discussed, an example of a feature binding table is shown in FIG. 7a.

A feature table is then looked up and related items for the determined feature are then identified (step 1112). Accordingly, when a feature is associated with the selected marketing object container, then the feature table is then referenced, such as the feature table shown in FIG. 7b, to determine an item 700 related for the determined feature, such as cross sell. Thereafter, the flow diagram in FIG. 6a may be referenced to determine whether a time schedule is associated with the selected offer (step 610). The remaining method as shown in FIGS. 6a and 6b may be followed.

Figure 12:
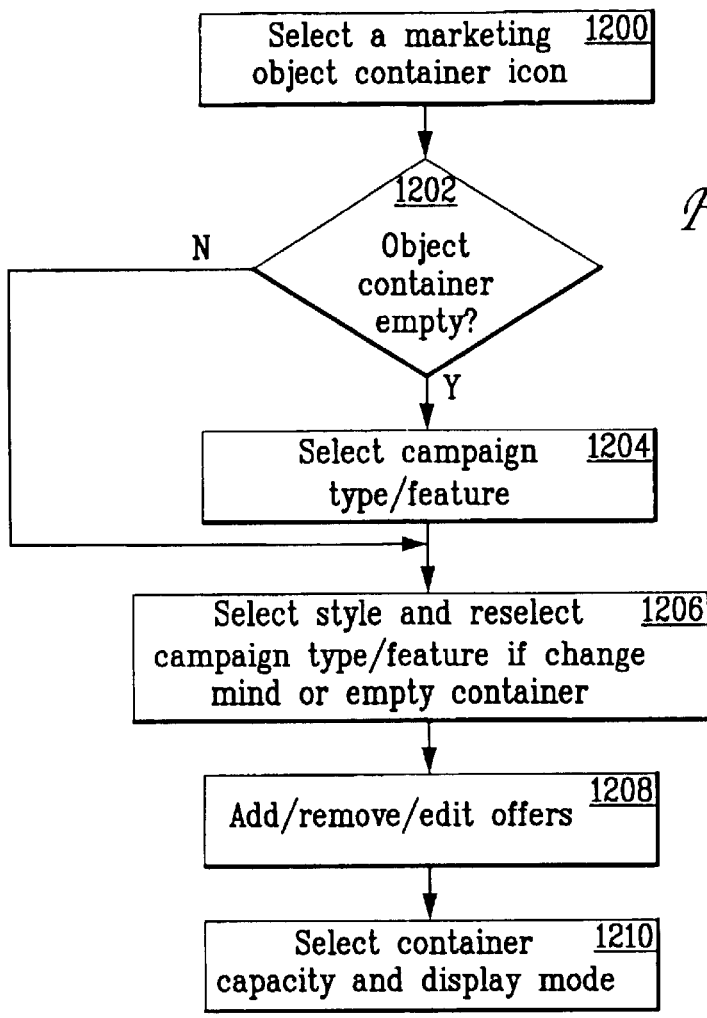
FIG. 12 is a flow diagram of a method according to an embodiment of the present invention for providing a marketing presentation using a management console.

FIG. 12 is a flow diagram of a method according to an embodiment of the present invention for providing a marketing presentation using a management console. A marketing object container icon is selected (step 1200). It is then determined whether the selected marketing object container is empty (step 1202). If it is empty, then a campaign type or feature is selected (step 1204). For example, the campaign type 514 of FIG. 5 is shown to be a weekly promotion. When a marketing object container icon, such as icons 506a and 506b of FIG. 5, is selected, the management workspace 504 is presented to the user. The management workspace can offer selections such as the campaign type 514.

The user may also select a style and reselect a campaign type or feature if the user prefers to change a current style or feature, or if the marketing object container is empty (step 1206). The user may add, remove, or edit offers, (step 1208). In the example shown in FIG. 5, the offers for the selected campaign includes a Canon camera 516. These offers can be removed or edited, or a new offer added, through various input methods, such as selecting an option through a pull-down menu or through the add/del/edit buttons shown in FIG. 5.

A capacity and display mode of a marketing object container may also be selected by the user (step 1210). An example of container capacity includes the number of items that can be displayed at a given time in a selected marketing object container. For example, three different items may be offered in a single marketing object container at any given time if the user selects three for the container capacity. Examples of display mode include simultaneous display of the selected items, or multiple items to be displayed one at a time based on a display schedule.

Figure 13:
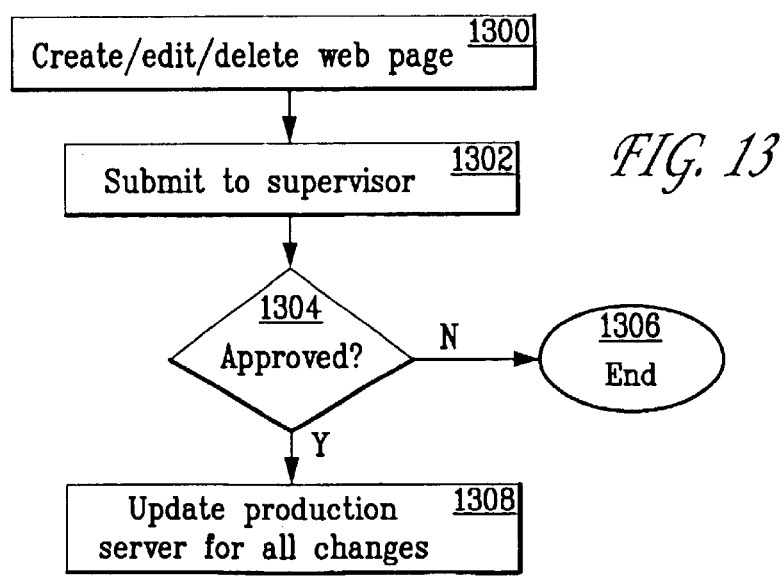
FIG. 13 is a flow diagram of a method according to an embodiment of the present invention for providing a marketing presentation using a staging server.

FIG. 13 is a flow diagram of a method according to an embodiment of the present invention for providing a marketing presentation using a staging server. A web page is created/edited/deleted as previously discussed in conjunction with the previous figures (step 1300). The change to the web page is then submitted to a supervisor (step 1302). It is then determined whether the supervisor approves the change (step 1304). If the supervisor does not approve of the change to the web page, then the changes are not implemented (step 1306). If, however, the changes are approved, then the production server is updated for all the changes and the changes are implemented (step 1308). In the example shown in FIG. 2, the user would make changes to a web page via the web server 204 and the management console 214. The changes would be forwarded to the staging server 210 so that the changes can be simulated without being implemented. If the changes are approved by a supervisor, then the changes may be updated from the staging server 210 to the production server 212 and implemented such that the shopper 200 can view the changes.

Figure 14:
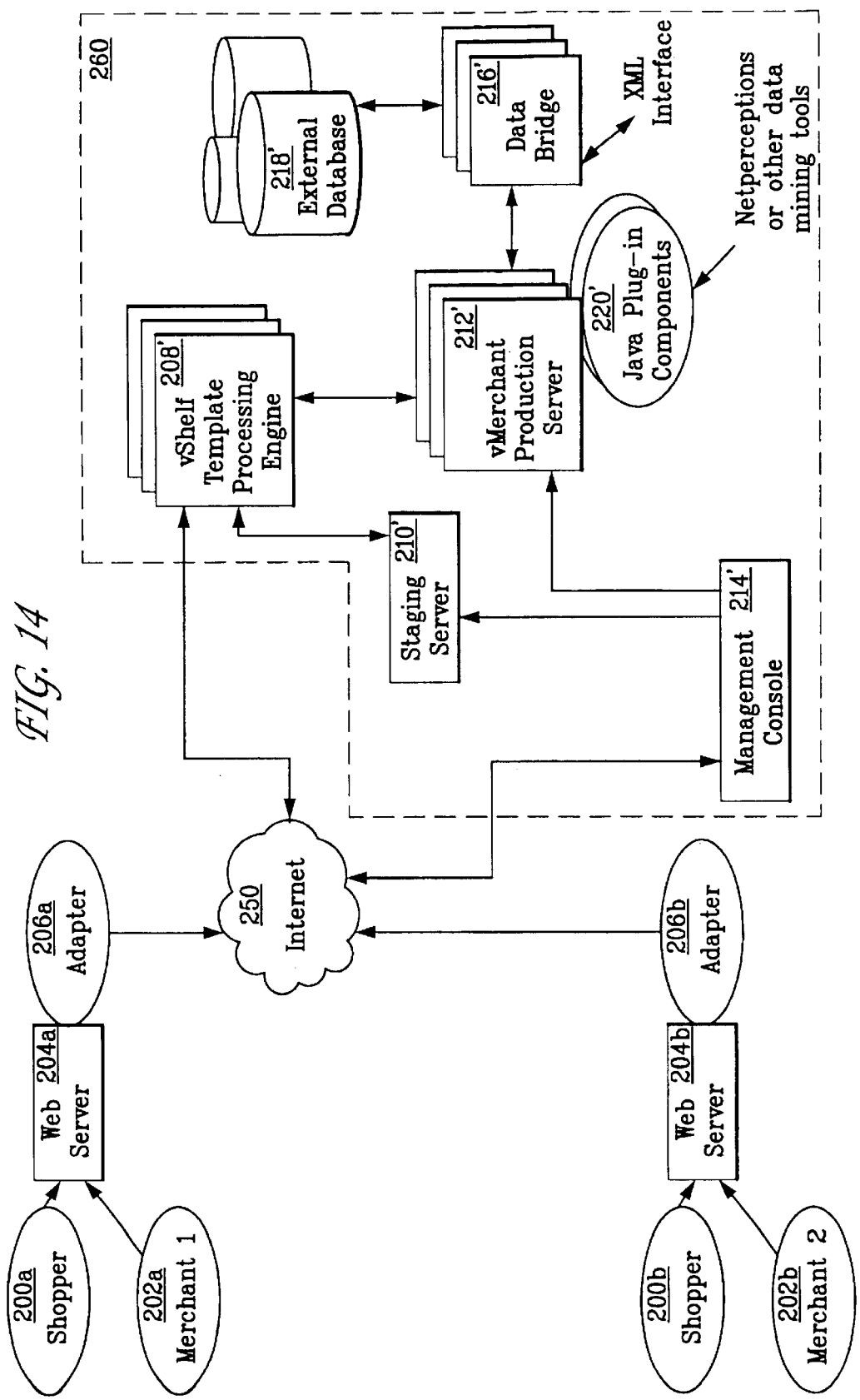
FIG. 14 is a system architectural diagram according to another embodiment of the present invention for providing a marketing presentation.

FIG. 14 is a system architectural diagram of another embodiment of the present invention for providing a marketing presentation. The example in FIG. 14 is similar to that shown in FIG. 2 with the exception of the template processing engine 208' being accessed through the Internet 250 by one or more web servers 204a–204b and adapters 206a–206b. In this embodiment, multiple shoppers 200a–200b can access multiple web servers 204a–204b that are, for example, owned or controlled by parties independent of the party controlling the rest of the architecture 260.

In this manner, a marketing object container may be controlled by a party controlling the primary architecture 260 but displayed on a third party web server 204a–204b. Likewise, although shoppers 200a–200b access other companies' web servers 204a–204b, they can interact and view marketing material controlled by the owner of the primary architecture 260.

Figure 15:
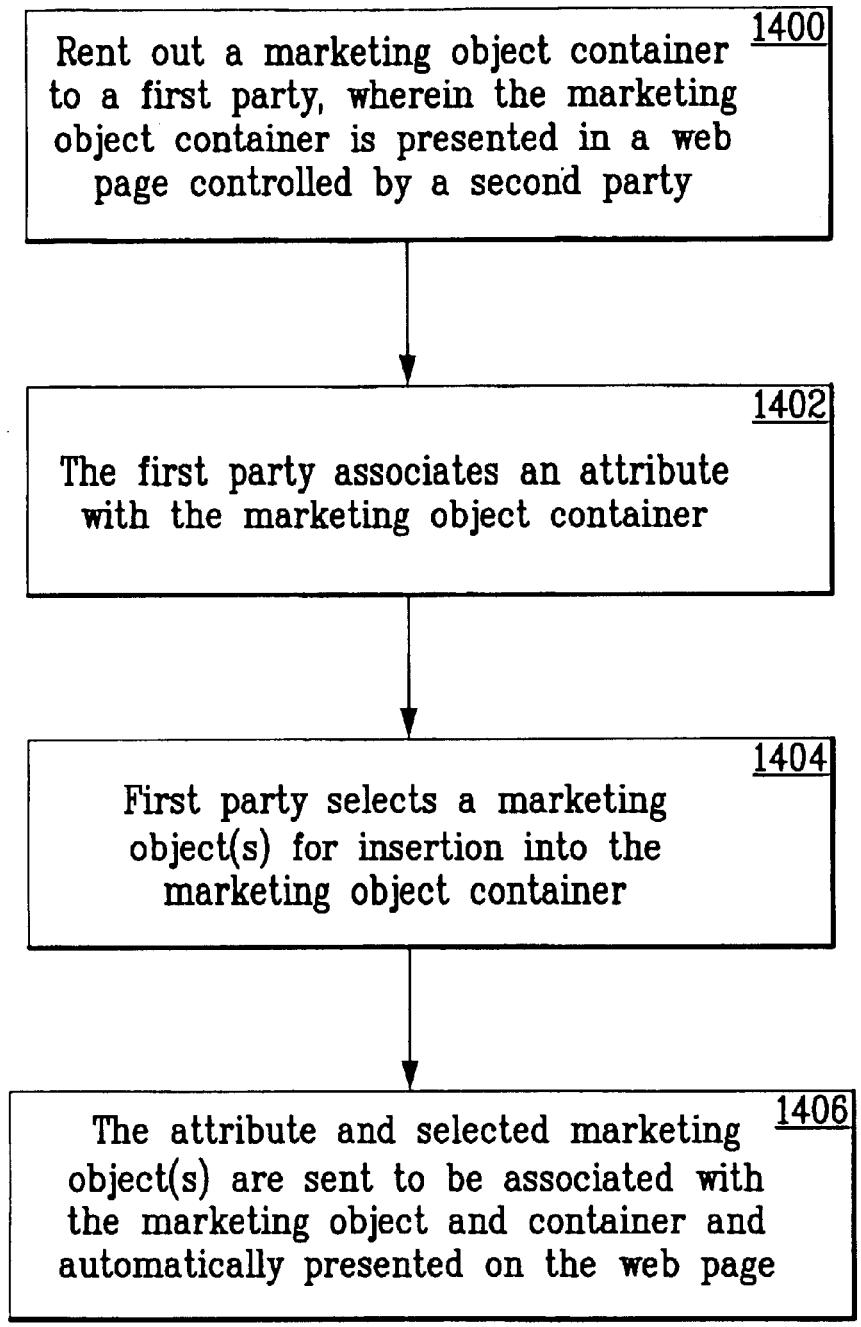
FIG. 15 is a flow diagram of method according to another embodiment of the present invention for providing a marketing presentation.

FIG. 15 is a flow diagram of a method according to another embodiment of the present invention for providing a marketing presentation. The example of the method shown in FIG. 15 may be used in conjunction with the architecture shown in FIG. 14.

A marketing object container is rented out to a first party wherein the marketing object container is presented in a web page controlled by a second party (step 1400). The first party associates an attribute with the marketing object container (step 1402). The first party selects a marketing object or objects for insertion into the marketing object container (step 1404). The attribute and selected marketing object (s) are sent to be associated with the marketing object container and automatically presented on the web page (step 1406).

Figure 16:
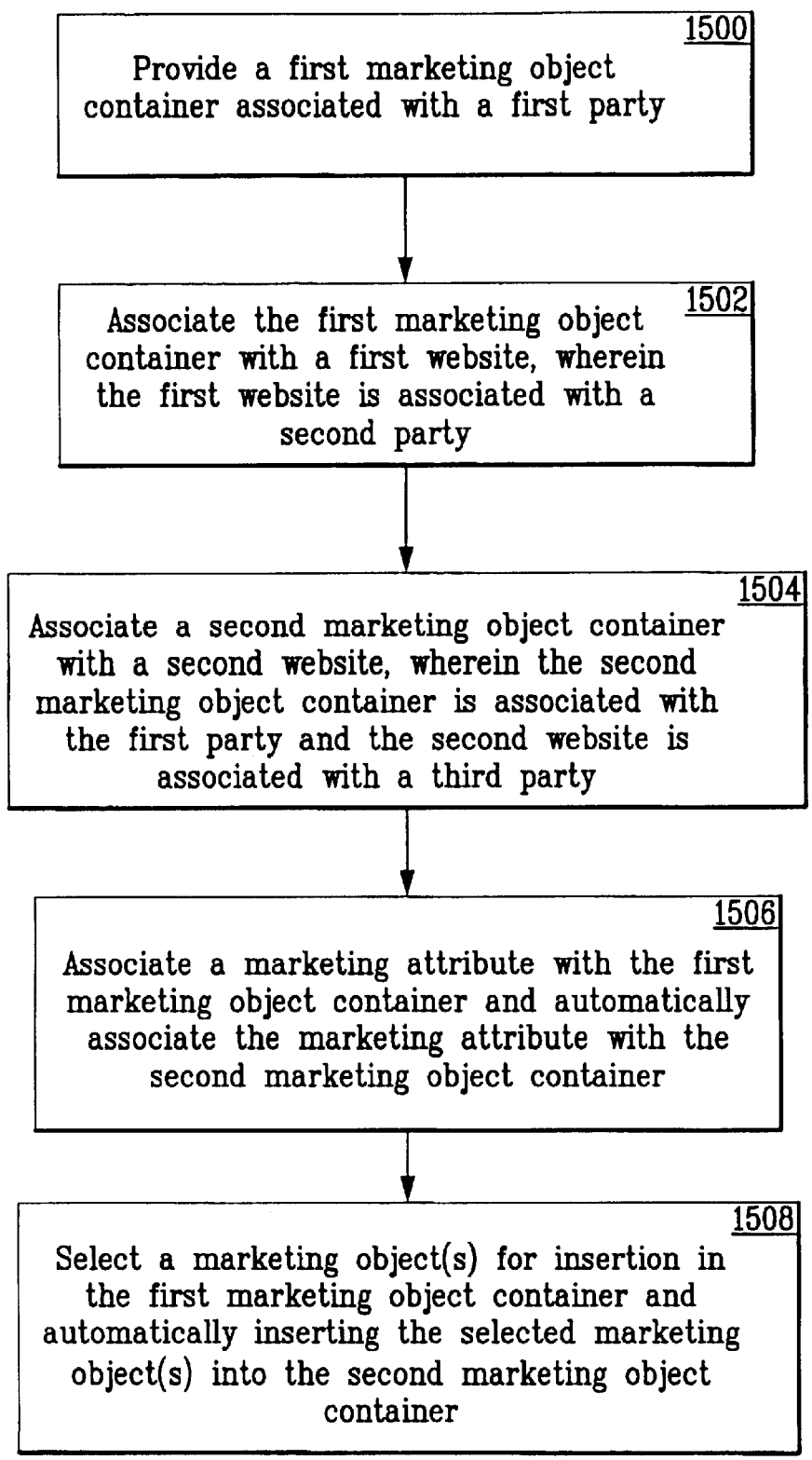
FIG. 16 is a flow diagram of method according to another embodiment of the present invention for providing a marketing presentation.

FIG. 16 is a flow diagram of a method according to another embodiment of the present invention for providing a marketing presentation. The method shown in FIG. 16 may also be used in conjunction with the architecture shown in FIG. 14. A first marketing object container associated with a first party is provided (step 1500). For example, assume that a first marketing object container is associated with a party who controls the primary architecture 260 of FIG. 14. The first marketing object container is associated with a first website wherein the first website is associated with a second party (step 1502). Although the first marketing object container is associated with the first party, it may be displayed through web server 204a, for example, which may be controlled by a second party.

A second marketing object container is also associated with a second website wherein the second marketing object container is associated with the first party and the second website is associated with a third party (step 1504). In the example shown in FIG. 14, the second marketing object container is associated with the party who controls the primary architecture 260 but it is associated with the second website, such as web server 204b, which is controlled by a third party.

A marketing attribute is associated with the first marketing object container and the marketing attribute is automatically associated with the second marketing object container (step 1506). When a marketing object or objects are selected for insertion in the first marketing object container, the selected marketing object (s) is automatically inserted into the second marketing object container (step 1508).

For example, if Wall Mart controls the primary architecture 260 of FIG. 14, it can rent out a first marketing object container accessible through the web server 204a, controlled by Yahoo. Wall Mart can also lease a second marketing object container which is accessible through web server 204b and controlled by Amazon. When Wall Mart associates a marketing attribute, such as an item for sale presented in a particular style to be presented through the first marketing object container viewed through a Yahoo web page, then the second marketing object container viewed through an Amazon web page is also automatically changed to present the same item in the same style.

Figure 17:
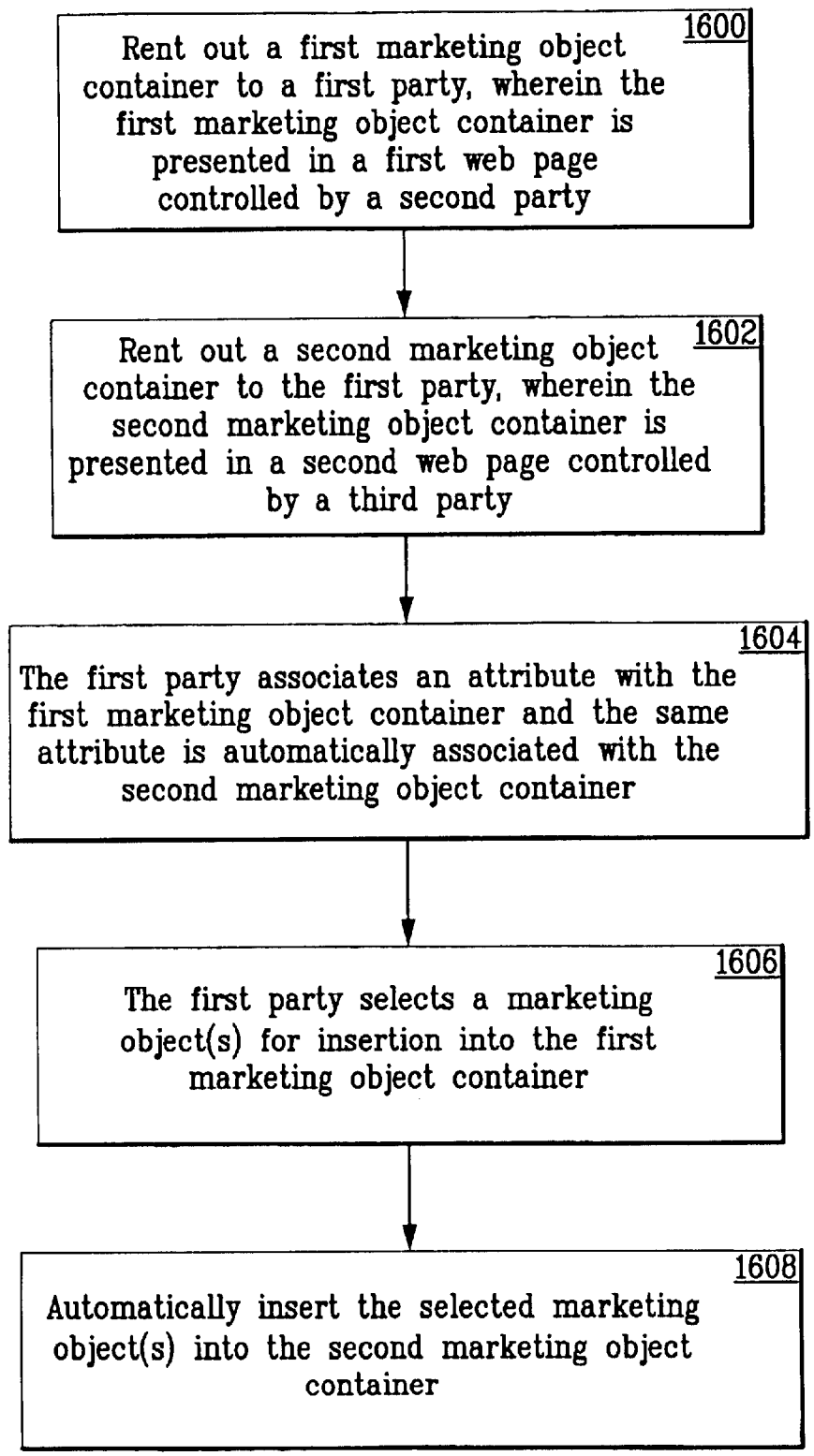
FIG. 17 is a flow diagram of a method according to another embodiment of the present invention for providing a marketing presentation.

FIG. 17 is a flow diagram according to another embodiment of the present invention for providing a marketing presentation. The method shown in FIG. 17 may also be used in conjunction with the architecture shown in FIG. 14.

A first marketing object container is rented out to a first party, wherein the first marketing object container is presented in a first web page controlled by a second party (step 1600). A second marketing object container is also rented out to the first party, wherein the second marketing object containers is presented in a second web page controlled by a third party (step 1602). The first party associates an attribute with the first marketing object container and the same attribute is automatically associated with the second marketing container (step 1604). The first party selects a marketing object (s) for insertion into the first marketing object container (step 1606). The selected marketing object (s) is automatically inserted into the second marketing object container (step 1608).

Accordingly, the marketing presentation can be managed by a service provider. In this example, at least some of the users can be unrelated, and the unrelated users are only allowed access to their own marketing presentations. The service provider can generate profits in various ways. For example, the service provider can receive a commission based on revenue generated by a user's marketing presentation. Alternatively, the service provider can receive a commission based on revenue generated by a user's marketing presentation. The service provider can also receive fees from users for hosting their marketing presentations.

A method and system for providing a marketing presentation has been disclosed. Software written according to the present invention may be stored in some form of computer-readable medium, such as memory or CD-ROM, or transmitted over a network, and executed by a processor.

Although the present invention has been described in accordance with the embodiment shown, one of ordinary skill in the art will readily recognize that there could be variations to the embodiment and these variations would be within the spirit and scope of the present invention. Accordingly, many modifications may be made by one of ordinary skill in the art without departing from the spirit and scope of the appended claims.

What is claimed is:

1. A method of providing an electronic marketing presentation, comprising:

displaying a first marketing object container, said first marketing object container including a location for receiving at least one marketing object to be presented in said first marketing container to a user of an interactive medium;

associating a marketing attribute with the first marketing object container;

selecting a plurality of marketing objects to be associated with the first marketing object container, the marketing attribute being configured for determining which of the selected marketing objects is associated with the first marketing object container at a particular time; and inserting the selected marketing objects in the first marketing object container based on a second marketing object of a second marketing object container.

2. The method of claim 1, further comprising displaying a marketing object container icon, wherein an option associated with the first marketing object container is presented when the icon is selected.

3. The method of claim 1, further comprising presenting a plurality of marketing objects that are compatible with the selected attribute.

4. The method of claim 1, further comprising associating an item with the marketing attribute.

5. The method of claim 1, wherein the at least one marketing object is displayed after it has been approved.

6. A method of creating a marketing presentation in a display medium, comprising:

defining the location and size of a first marketing object container in the display medium;

associating a marketing attribute with the first marketing object container, the marketing attribute including parameters that define how the first marketing object container can be used in a marketing presentation;

receiving subsequently from a user a selection of the first marketing object container and at least a first marketing object to be displayed in the first marketing object container;

binding the first marketing object to the first marketing object container; and displaying the first marketing object in the first marketing object container in accordance with the parameters of the marketing attribute and responsive to the presence of a second marketing object in a second marketing object container.

7. A method of creating a marketing presentation in an interactive medium, comprising:

displaying a marketing object container on a display medium;

in response to a selection of the marketing object container, displaying a number of campaigns that are available to associate with the marketing object container, each of said campaigns being associated with a plurality of offers compatible with the campaign;

receiving a selection of a campaign to apply to the marketing object container;

displaying the plurality of offers that are compatible with the selected campaign; and receiving a selection of at least one offer for placing in the marketing object container.

8. A system of providing an electronic marketing presentation, comprising:

a processor configured to display a plurality of marketing object containers, each of said plurality of marketing object containers including a location for receiving at least one marketing object to be presented by means of said marketing container to a user of an interactive medium; the processor also being configured to facilitate associating a marketing attribute with the marketing object container; and selecting a first of the plurality of marketing objects for display within a first marketing object container of the plurality of marketing object containers responsive to a second of the plurality of marketing objects; and a memory coupled with the processor, the memory being configured to provide the processor with instructions.

9. A computer readable medium including a computer program, the computer program comprising:

computer code configured for displaying a first marketing object container;

computer code configured for associating a marketing attribute with the first marketing object container; and computer code configured for selecting a plurality of marketing objects;

computer code configured for determining a first marketing object for display, within the marketing object container, to a user of an interactive medium, the first marketing object being one of the plurality of marketing objects, the determination being responsive to the marketing attribute and to a second marketing object container configured to display a second marketing object.

10. The computer readable medium of claim 9, wherein the computer readable medium is selected from the group consisting of CD-ROM, floppy disk, tape, flash memory, system memory, hard drive, and data signal embodied in a carrier wave.

11. A method of providing an electronic marketing presentation, comprising:

displaying a first marketing object container, said first marketing object container including a location for receiving at least one marketing object to be displayed within said first marketing container to a user of an interactive medium;

associating a marketing attribute with the first marketing object container;

selecting a plurality of marketing objects for association with the first marketing object container; and determining a first marketing object for display at the receiving location of the first marketing object container, the determination being responsive to the associated marketing attribute and to a second marketing object of a second marketing object container.

12. The method of claim 11, further comprising presenting a plurality of marketing attributes associatable with the first marketing object container.

13. The method of claim 11, further comprising associating a style template with the first marketing object container.

14. The method of claim 13, further comprising filling in an object into the style template.

15. The method of claim 11, further comprising selecting a style for the first marketing object container.

16. The method of claim 11, wherein the first marketing object container is dynamically associated with the marketing attribute.

17. The method of claim 11, wherein the marketing attribute describes a feature of the first marketing object container.

18. The method of claim 11, further including setting a value of the marketing attribute, wherein the value describes a feature of the first marketing object container.

19. A method of providing an electronic marketing presentation, comprising:

displaying a first marketing object container;

associating a marketing attribute with the first marketing object container;

selecting a plurality of marketing objects; and determining a first marketing object for display within the marketing object container to a user of an interactive medium, the first marketing object being one of the plurality of marketing objects, the determination being responsive to the marketing attribute and to a second marketing object container configured to display a second marketing object.

20. The method of claim 19, further comprising associating a feature with the first marketing object container.

21. The method of claim 20, wherein the feature is a cross sell.

22. The method of claim 20, wherein the feature is an up sell.

23. The method of claim 20, wherein the feature is a product literature.

24. The method of claim 20, further comprising associating the first marketing object with the feature.

25. The method of claim 19, wherein the first marketing object container is dynamically associated with the first marketing object.

26. The method of claim 19, wherein the plurality of marketing objects is selected to be associated with the first marketing object container, and wherein the marketing attribute determines which of the selected marketing objects is associated with first the marketing object container at a particular time.

27. The method of claim 26 wherein the selected marketing objects are associated with the first marketing object container according to a schedule.

28. The method of claim 26 wherein the selected marketing objects are inserted in the first marketing object container based on the second marketing object of the second marketing object container.

29. The method of claim 19, wherein the marketing attribute is configured to describe a relationship of the first marketing object container with the second marketing object container.

30. The method of claim 19, wherein the marketing attribute is configured to describe what objects can be associated with the first marketing object container.

31. The method of claim 19, wherein the marketing attribute is configured to describe timing and priority of the display of marketing objects to be associated with the first marketing object container.

32. The method of claim 31, wherein the timing is on a daily, weekly, monthly or holiday basis.

33. The method of claim 19, wherein the marketing attribute includes a marketing campaign.

34. The method of claim 33, wherein the marketing campaign includes a banner ad campaign.

35. The method of claim 33, wherein the marketing campaign includes a banner ad campaign, a cross sell campaign, an event promotion campaign, a holiday promotion campaign, a weekly promotion campaign, an up-sell campaign, or a new product introduction campaign.

36. The method of claim 19, wherein the marketing attribute is associated with the first marketing object container prior to determining a first marketing object for display.

37. The method of claim 19, further including setting a value of the marketing attribute, wherein the value describes the first marketing object container as having a feature selected from a set consisting of cross sell, daily promotion, holiday promotion, on sale, item detail, and up sell.

38. The method of claim 19, wherein selecting a plurality of marketing objects is responsive to a feature of the marketing object container described by the marketing attribute.

* * * * *

UNITED STATES PATENT AND TRADEMARK OFFICE
CERTIFICATE OF CORRECTION

PATENT NO. : 7,028,254 B2
APPLICATION NO. : 09/483175
DATED : April 11, 2006
INVENTOR(S) : Chun R. Xia et al.

It is certified that error appears in the above-identified patent and that said Letters Patent is hereby corrected as shown below:

On the Title Page Item (73) replace "PeopleSoft, Inc." with --Oracle International Corporation--.

Signed and Sealed this

Twenty-second Day of May, 2007

JON W. DUDAS
*Director of the United States Patent and Trademark Office*